US011327905B2

(12) United States Patent
Zhou et al.

(10) Patent No.: US 11,327,905 B2
(45) Date of Patent: *May 10, 2022

(54) INTENTS AND LOCKS WITH INTENT

(71) Applicant: Microsoft Technology Licensing, LLC, Redmond, WA (US)

(72) Inventors: Lidong Zhou, Bellevue, WA (US); Jacob R. Lorch, Bellevue, WA (US); Jinglei Ren, Beijing (CN); Parveen Kumar Patel, San Jose, CA (US); Srinath Setty, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/878,190

(22) Filed: May 19, 2020

(65) Prior Publication Data
US 2020/0301855 A1 Sep. 24, 2020

Related U.S. Application Data

(63) Continuation of application No. 15/709,072, filed on Sep. 19, 2017, now Pat. No. 10,691,622.

(30) Foreign Application Priority Data

Sep. 29, 2016 (CN) .......................... 201610864594.X

(51) Int. Cl.
G06F 3/06 (2006.01)
G06F 12/14 (2006.01)
(Continued)

(52) U.S. Cl.
CPC .......... G06F 12/1475 (2013.01); G06F 3/067 (2013.01); G06F 3/0619 (2013.01);
(Continued)

(58) Field of Classification Search
CPC ............. G06F 12/1475; G06F 16/2336; G06F 16/1774; G06F 3/0637; G06F 3/0619;
(Continued)

(56) References Cited

U.S. PATENT DOCUMENTS

| | | | | |
|---|---|---|---|---|
| 2005/0216462 A1* | 9/2005 | Xiao | .................... | G06F 16/2343 |
| 2007/0101057 A1* | 5/2007 | Holt | ..................... | G06F 12/0815 |
| | | | | 711/113 |

FOREIGN PATENT DOCUMENTS

| | | |
|---|---|---|
| CN | 1227644 A | 9/1999 |
| CN | 1797352 A | 7/2006 |

(Continued)

OTHER PUBLICATIONS

"First Office Action and Search Report Issued in Chinese Patent Application No. 201610864594.X", dated Sep. 16, 2020, 15 Pages.
(Continued)

*Primary Examiner* — Tasnima Matin

(57) ABSTRACT

A computing device requests access to an application object from a remote storage system in order to locally execute application functionality without hosting application resources. An accessed object is associated with an intent in the storage system and locked. Locking an object in combination with an intent prevents computing devices that are not performing the intent from accessing the object. An intent defines one or more operations to be performed with the requested object, which are serialized as intent steps and stored in the storage system. Upon executing an intent step, the computing device stores a log entry at the storage system signifying the step's completion. A locked object remains locked until the log entries indicate every intent step as complete. Different computing devices can unlock a locked object by executing any incomplete steps of an intent associated with the locked object.

20 Claims, 6 Drawing Sheets

(51) Int. Cl.
  *G06F 9/52* (2006.01)
  *G06F 16/176* (2019.01)
  *G06F 16/23* (2019.01)

(52) U.S. Cl.
  CPC .......... *G06F 3/0623* (2013.01); *G06F 3/0637* (2013.01); *G06F 3/0644* (2013.01); *G06F 9/526* (2013.01); *G06F 12/145* (2013.01); *G06F 16/1774* (2019.01); *G06F 16/2336* (2019.01)

(58) Field of Classification Search
  CPC ........ G06F 9/526; G06F 3/067; G06F 3/0623; G06F 9/54; G06F 12/145; G06F 3/0644
  See application file for complete search history.

(56) References Cited

FOREIGN PATENT DOCUMENTS

| CN | 101046756 A | 10/2007 |
|---|---|---|
| CN | 101103662 A | 1/2008 |
| CN | 101706802 A | 5/2010 |
| CN | 102053861 A | 5/2011 |
| CN | 102073588 A | 5/2011 |
| CN | 102214088 A | 10/2011 |
| CN | 102317918 A | 1/2012 |
| CN | 102385611 A | 3/2012 |
| CN | 103761182 A | 4/2014 |
| CN | 105069008 A | 11/2015 |
| CN | 105138310 A | 12/2015 |

OTHER PUBLICATIONS

Zhang, Wei, "Research and Implementation of Concurrent Access Control Based on Shared Resource Declaration", In Dissertation for Master's Degree of University of Science and Technology of China, Dec. 29, 2010, 71 Pages.

Li, Huang, "Research on Multithreaded Deadlock Detection Based on Petri Net", In Chinese Master's Theses Full-text Database Computer Technology, No. 9, Sep. 15, 2015, 2 Pages.

"Notice of Allowance and Search Report Issued in Chinese Patent Application No. 201610864594.X", dated Mar. 12, 2021, 10 Pages.

"Office Action Issued in European Patent Application No. 17780277. 4", dated Dec. 21, 2020, 6 Pages.

* cited by examiner

200

600

INTENTS AND LOCKS WITH INTENT

RELATED APPLICATIONS

This application is a continuation of and claims priority to U.S. patent application Ser. No. 15/709,072, which was titled "Intents and Locks with Intent" and was filed on Sep. 19, 2017 and further claims priority, under 35 USC 119 or 365, to Chinese Patent Application No. 201610864594.X, filed Sep. 29, 2016 and titled "Intents and Locks with Intent", the disclosure of each is incorporated by reference herein in their entireties.

BACKGROUND

As computing technology has advanced, distributed storage systems have become popular choices for deploying applications. Distributed storage systems, such as cloud storage systems, offer reliable storage services with simple application programming interfaces (APIs) that hide the distributed nature of the underlying storage. This hidden distributed nature alleviates the need for application developers to handle distributed-system issues such as data partitioning, fault tolerance, and load balancing. In distributed computing environments, application data can be stored at a storage system while application computations are performed by one or more computing devices located remotely from the storage system.

Although storage system providers typically implement fault-tolerance protocols, these storage systems are not without their problems. For example, different computing devices, computing device programs, and computing device virtual machines often request access to a single storage system object at the same time. While accessing an object, computing devices performing application computations can fail, application processes on devices can crash, and a network connecting the computing devices to the storage system can drop or reorder communications. In order to address these and other problems, storage systems can lock stored objects during access by a computing device. However, locks are not without their problems. One such problem is that a computing device accessing a locked object may fail to complete executing functionality associated with the locked object, causing the storage system to lock an object indefinitely. Furthermore, storage services tend to offer limited, low-level APIs that restrict application operations to objects within a storage area. Thus, it remains difficult to develop applications for distributed computing environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a computing device communicates a request to a storage system for access to an object. The computing device provides the storage system with an intent associated with the object. In response to providing the intent associated with the object, the computing device causes the storage system to lock the requested object and obtains access to the requested object. Using the obtained object, the computing device then executes one or more steps of the intent. Results of the executed one or more steps are communicated to the storage system. Upon completing all steps of the intent, the computing device causes the storage system to unlock the locked object.

In accordance with one or more aspects, a computing device ascertains that an object is locked in a storage system. The computing device ascertains an intent associated with the locked object. The computing device ascertains if the object has been locked for a threshold amount of time. If the object has not been locked for the threshold amount of time, the computing device waits until the threshold amount of time elapses. In response to determining that the object has been locked for the threshold amount of time, the computing device ascertains one or more incomplete steps of an intent associated with the locked object and executes the one or more incomplete steps. The computing device communicates the results of the executed steps to the storage system. After executing all incomplete steps and communicating results of the executed steps of the intent associated with the locked object to the storage system, the computing device causes the storage system to unlock the locked object.

In accordance with one or more aspects, a storage system receives a request from a computing device to access an object. The storage system receives an intent associated with the requested object from the computing device. In response to receiving the intent associated with the requested object, the storage system locks the requested object and provides the computing device with access to the requested object. The storage system receives an indication that the intent associated with the requested object is complete. In response to ascertaining that the intent associated with the requested object is complete, the storage system unlocks the locked object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
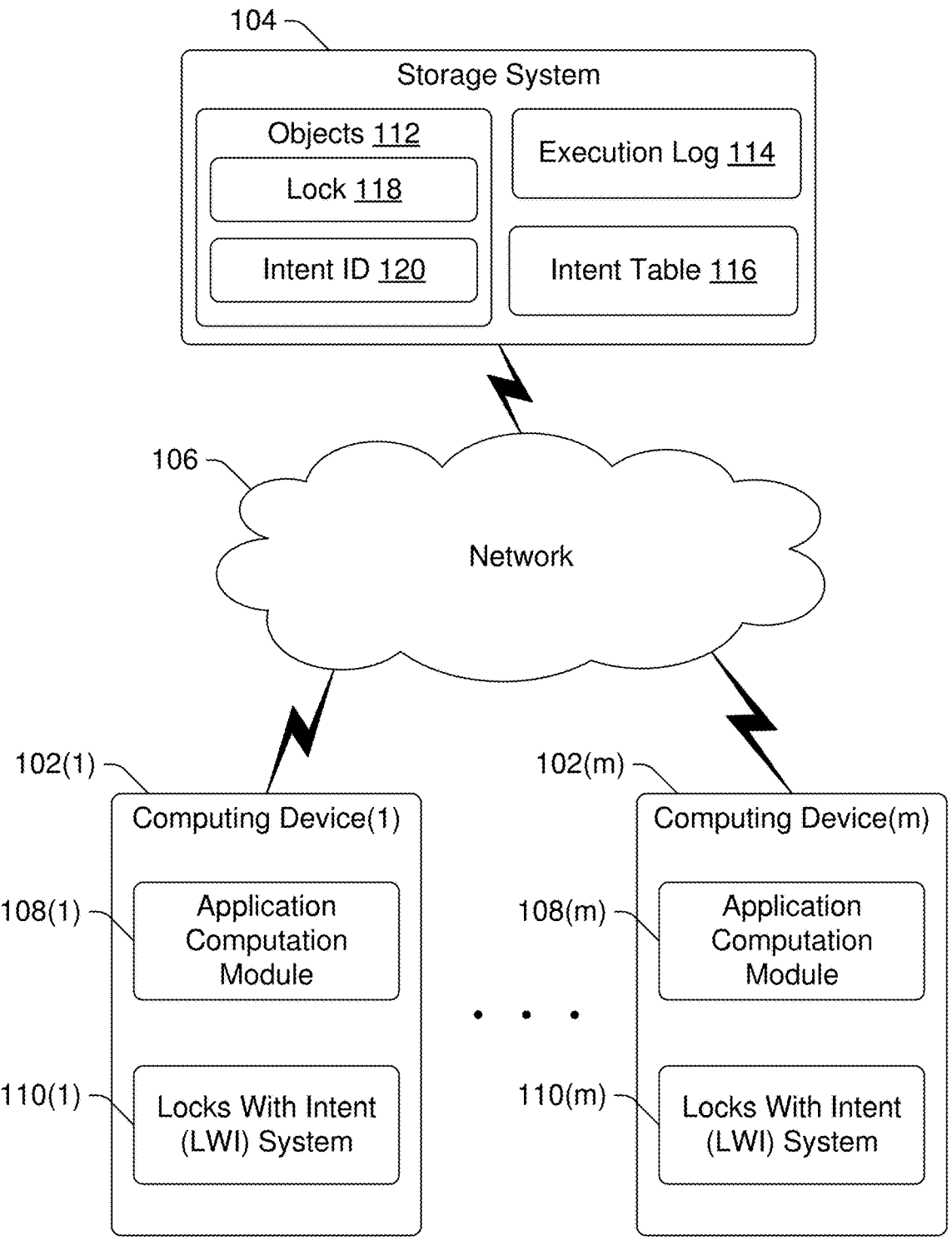
FIG. 1 illustrates an example system implementing locks with intent for performing application computations in accordance with one or more embodiments.

Storage system abstraction techniques for executing application functionality in a distributed computing environment are discussed herein. A plurality of computing devices are connected to the storage system via a network and are configured to execute operations for the application stored at the storage system. In one or more embodiments, individual ones of the plurality of computing devices are configured to execute the operations using a plurality of program instances or virtual machines running on the computing device. When a computing device executes application operations, the computing device requests access to one or more application objects stored at the storage system. As discussed herein, an application object, or simply object, refers to a location in storage system memory. An object can include data, a variable, executable code that can be used to perform a function or method of the application, or combinations thereof. In many situations, a computing device alters application data in an accessed storage system object when executing application operations. For example, a computing device may cause the storage system to create additional objects, delete existing objects, or update an object's value. An application computation module is implemented on each computing device, which executes application functionality using application objects accessed from the storage system.

A locks with intent (LWI) system is implemented by each computing device connected to the storage system. The LWI system provides an abstract representation of a storage system's APIs and underlying storage capabilities and organization. A computing device interacts with a storage system by assuming that the storage system provides an interface as represented by the LWI system. In order to enable communication with a range of different storage systems, the LWI system exposes a set of APIs to applications on the computing device that are supported among the range of different storage systems. These APIs enable a computing device to request objects from a storage system and communicate results of operations associated with objects back to the storage system. When the computing device requests access to a storage system object in order to execute application functionality, the computing device uses the LWI system to communicate an intent associated with the requested object to the storage system.

An intent, as discussed herein, is an arbitrary snippet of code that is configured to contain both storage system operations and computing device operations associated with an object. For example, an intent can be an object of a class with a "run" method and serialization routines. Thus, an intent indicates one or more actions or operations that are to be performed with the requested object to execute application functionality. Each action or operation associated with an intent can also be referred to as a "step", and a single intent may require the completion of multiple steps. Using the LWI system, a computing device requests access to a storage system object and causes the storage system to store an intent identifier associated with the requested object. This intent identifier indicates the intent associated with the requested object to both the storage system and other computing devices that might request access to the requested object. Using the LWI system, the computing device can also cause the storage system to associate a lock with the intent, which locks the requested object until one or more steps of the intent are complete. This ensures a different computing device does not access a locked object while the computing device that originally requested the object is performing steps associated with the intent.

Traditionally, a lock restricts access to a single computing device holding the lock, thereby ensuring that a different computing device is unable to access the locked object until the single computing device completes executing application functionality associated with the locked object.

In order to address problems associated with traditional locks, a computing device uses the LWI system to create and update an intent table at the storage system that lists intents associated with objects. Specifically, when a computing device requests access to an object and indicates an intent associated with the requested object, the intent is added to an intent table in the storage system. Each intent in the intent table is associated with an intent identifier, which corresponds to the intent identifier associated with the requested object, as discussed above. The intent table thus lists all intents associated with objects in the storage system. In this manner, the LWI system enables a computing device to ascertain an intent associated with an object, even when the object is locked.

The LWI system additionally logs each computing device's execution of intent steps in an execution log on the storage system through the use of distributed atomic affinity logging (DAAL). For each step in an intent, the LWI system enters a unique log entry in an execution table in the storage system. Each log entry in the execution table signifies completion of an associated intent step, enabling the storage system to record that one or more execution steps have been performed. This execution table thus enables a plurality of computing devices to ascertain what steps associated with an intent have been completed and what steps associated with an intent have yet to be completed. For example, in scenarios where multiple different computing devices are concurrently executing the same intent with a single object, each of the multiple different computing devices can query the execution log to ascertain whether a DAAL entry exists for an execution step. If a DAAL entry exists for a specific step, each of the multiple different computing devices skips performing execution of the specific step and uses a result of the specific step as indicated by the DAAL entry. In the absence of a DAAL entry for a given step, a computing device proceeds with executing the given step. When a computing device begins execution of a given step, it causes the storage system to generate a DAAL entry indicating that execution of the step has commenced. Upon completing execution of the given step, the computing device communicates any results associated with execution of the given step to the storage system and causes the storage system to update the DAAL entry, signifying completion of this step. Any other computing device running the same intent is thus able to ascertain that the given step has already been executed and ascertain any results associated with execution of the given step. This ensures execution of each intent step exactly once, even in situations where multiple computing devices are concurrently executing a common intent on an object.

The LWI system can also include an intent collector, which is configured to interface with the storage system and poll the intent table and execution log to identify incomplete intents associated with objects on the storage system. The intent collector compares entries in the execution log with intents in the intent table and identifies intent steps that have not been completed within a threshold period of time. In one or more embodiments, this threshold period of time is configurable by an administrator of the storage system. In one or more implementations, the intent collector identifies incomplete intents based on the absence of DAAL entries in the execution log. Alternatively or additionally, the intent collector identifies incomplete intents based on DAAL entries indicating that an intent step has begun, but not yet completed, in the execution log. When the intent collector ascertains that an intent step has not been completed within the threshold period of time, the intent collector executes the incomplete intent steps and enters DAAL entries in the execution log signifying completion of the incomplete intent steps. In this manner, a computing device can use the intent collector to unlock a requested storage system object that was previously locked by a different computing device.

FIG. 1 is a block diagram illustrating an example system 100 implementing storage system abstraction techniques for performing application computations in accordance with one or more embodiments. System 100 includes multiple (m) computing devices 102 that can each communicate with a storage system 104 via a network 106. Network 106 can be a variety of different networks, including the Internet, a local area network (LAN), a public telephone network, an intranet, other public and/or proprietary networks, combinations thereof, and so forth.

Each computing device 102 can be any one of a variety of different types of computing devices, such as a desktop computer, a server computer, a virtual machine, a laptop or netbook computer, a mobile device (e.g., a tablet or phablet device, a cellular or other wireless phone (e.g., a smartphone), a notepad computer, a mobile station), a wearable device (e.g., eyeglasses or head-mounted display (e.g., augmented reality (AR) or virtual reality (VR) eyeglasses or head-mounted display, watch, bracelet), an entertainment device (e.g., an entertainment appliance, a set-top box communicatively coupled to a display device, a game console), one of a plurality of virtual machines running on a single computing device, Internet of Things (IoT) devices (e.g., objects or things with software, firmware, and/or hardware to allow communication with other devices), a television or other display device, an automotive computer, and so forth. Thus, each computing device 102 can range from a full resource device with substantial memory and processor resources (e.g., personal computers, game consoles) to a low-resource device with limited memory and/or processing resources (e.g., traditional set-top boxes, handheld game consoles). Different ones of computing devices 102 can be the same or different types of computing devices. The functionality discussed herein as performed by a computing device 102 can additionally or alternatively be performed by one or more programs running on a hardware device.

Each computing device 102 includes one or more application computation modules 108 that are configured to execute functionality of one or more applications stored at storage system 104. Generally, functionality of one or more applications is executable through computer system executable instructions, including routines, programs, objects, components, logic, data structures, and so on that perform particular tasks for an application. Application computation module 108 is application-independent and is thus configured to execute functionality of various different types of applications. Through this configuration, computing devices 102 can implement a wide range of applications without locally maintaining application resources.

Each computing device 102 additionally includes a locks with intent (LWI) system 110. LWI system 110 provides computing device 102 with a common storage model that is an abstract representation of the storage system 104. By abstracting the storage system 104 with which computing device 102 is communicating, LWI system 110 enables the computing device to interface with various APIs of different storage systems. The various components and functionality of LWI system 110 are discussed in further detail below with respect to FIG. 2.

Storage system 104 is implemented by one or more devices that can each be a variety of different types of computing devices. Similar to the discussion of computing devices 102, the storage system 104 can be implemented by devices ranging from full resources devices with substantial memory and processor resources to low-resource devices with limited memory and/or processing resources. In one or more embodiments, storage system 104 is a cloud storage system, such as a Microsoft® Azure Storage system, an Amazon® DynamoDB system, a Google® Cloud Storage system, and so on. Alternatively, storage system 104 may be a large-scale distributed storage system, such as an Apache® Cassandra™ database, a MongoDB®, and so on.

Storage system 104 includes one or more objects 112, one or more execution logs 114, and one or more intent tables 116. Each object 112 refers to a location in storage system memory, and thus may refer to one of the plurality of rows of the one or more schemaless tables in the remote storage system. Additionally, as discussed herein the term "object" can interchangeably refer to a document, a partition or a table in the remote storage system. Because objects 112 are stored in a storage system that is remote from a computing device accessing the storage system, reference to an object 112 discussed herein corresponds to the object as stored in the remote storage system. Each object 112 can be associated with a lock 118 and an intent identifier (ID) 120.

LWI system 110 enables a computing device to lock an object 112 while the computing device is accessing the object by associating the object 112 with a lock 118 and an intent ID 120. The lock 118 and intent ID 120 represent metadata associated with an object in the storage system. This metadata can be associated with an object and can be updated by a lock management module of the LWI system 110, which is discussed in further detail with respect to FIG. 2. For example, lock management module 204 can associate lock 118 and intent ID 120 with object 112 through the use of invisible entries. An invisible entry, as discussed herein, is an entry in a storage system, such as storage system 104, which is stripped from (excluded from) any results returned to an application stored on the storage system. In this manner, the entries are ascertainable by computing device 102 interfacing with the storage system 104, but remain invisible to the application stored on the storage system.

A lock 118 is represented in metadata associated with an object 112 as an invisible Boolean attribute of the object. For example, a lock 118 having value of 1 may indicate that the object 112 is locked, while a value of 0 may indicate that the object is unlocked, or vice versa. In order to determine whether an object 112 is locked, a computing device implementing LWI system 110 uses a Read API to interface with the storage system storing object 112 and return a handle associated with the object. A value of the lock 118 is returned in this handle to the computing device, informing the computing device whether the object 112 is locked.

If a computing device ascertains that an object 112 is unlocked, the computing device can acquire a lock 118 on the object 112 by issuing a conditional update to the storage system. The computing device issues this conditional update including the returned handle from the Read API operation on the object 112 using APIs that are provided by LWI system 110 and discussed in further detail with respect to FIG. 2. The computing device obtains the lock 118 if, and only if, the conditional update succeeds. To release the lock, the computing device issues another conditional update to reset the Boolean value of lock 118. In accordance with one or more embodiments, this conditional update depends on whether execution of an intent associated with the object is complete. Associating an intent with an object is discussed in further detail below.

While an object 112 is locked, the lock prevents certain computing devices from accessing the object. For example, when an object 112 is locked in the traditional sense, the traditional lock prevents any computing device that did not set the lock from reading, updating, or deleting the locked object 112. As such, if a computing device holding a lock 118 on an object 112 fails to release the lock, the object may remain locked indefinitely. To address this problem, LWI system 110 enables a computing device to associate an object and any corresponding lock with an intent ID 120.

As discussed herein, an intent is an arbitrary snippet of code that is configured to contain both storage system operations and computing device operations associated with an object. Thus, an intent specifies one or more actions or operations that are to be performed with an object. As discussed herein, individual actions or operations associated with an intent are referred to as "intent steps" or simply "steps". For an intent that includes a series of steps to be performed, these steps are serialized and defined as part of the intent.

LWI system 110 associates every intent with a unique intent ID 120. LWI system 110 enables a computing device to associate an intent ID 120 with an object 112 in a storage system through the use of an invisible entry. As discussed above, this enables the computing device to enter an intent ID 120 into metadata associated with an object 112 in the storage system. When a computing device implementing LWI system 110 associates an intent ID 120 with an object 112, the LWI system 110 additionally uploads the intent ID 120 and one or more steps associated with the intent ID to an intent table 116 stored in the storage system. In accordance with one or more embodiments, associating an intent ID 120 with an object 112 and entering the intent ID 120 into the intent table 116 is performed by a lock management module of the LWI system 110, as discussed in further detail with respect to FIG. 2. The intent table 116 lists one or more intents based on their intent ID 120 and includes a list of the serialized intent steps. In accordance with one or more embodiments, LWI system 110 creates a different intent table 116 in the storage system for each different application hosted by the storage system.

A storage system's intent table 116 can be read by one or more computing devices accessing the storage system. As discussed above, the one or more computing devices can read an object 112 to identify an intent ID 120 associated with the object. Accordingly, using the intent ID read from object 112, a computing device interfacing with the storage system is able to query the intent table 116 to ascertain one or more steps associated with the intent ID. However, while the intent table 116 lists one or more steps associated with an intent, the intent table 116 alone does not provide an indication of whether execution of the one or more steps has been completed.

In order to ensure that execution of an intent step is performed exactly once, a computing device implementing LWI system 110 is configured to create an execution log 114 in storage system 104. Execution log 114 includes a list of one or more entries, associated with an intent ID 120, signifying that execution of one or more intent steps has begun or is complete. A computing device implementing LWI system 110 updates execution log 114 when executing an intent step through the use of distributed atomic affinity logging ("DAAL"). DAAL collocates the result of executing an intent step with the object 112 that the intent step changes. Thus, entries in a storage system's execution log 114 are associated with an intent ID 120 and serialized to provide an indication of execution progress, if any, of an intent. Specifically, while a computing device executes an intent step, the LWI system 110 adds a new row to the execution log 114 that lists an intent ID 120 and a step number within the intent. For non-deterministic operations performed on the computing device, such as the result of a random number generator, LWI system 110 stores any non-deterministic choices in the storage system's execution log 114. Similarly, for storage system operations that return results, such as read operations, the LWI system 110 causes these results to be stored in the storage system execution log 114.

Entries in the execution log 114 prevent redundant execution of intent steps to ensure exactly-once semantics. A computing device implementing LWI system 110 queries a storage system's execution log 114 before performing an intent step and executes the intent step only in the absence of an execution log entry corresponding to that step. For example, if an intent includes five sequential steps and the execution log 114 indicates that steps one, two, and three are complete, the computing device uses any values for the completed steps that are stored in the execution log 114 and continues to execute steps four and five.

Intent step entries in the execution log 114 are collocated with an object 112 being modified by the intent steps. Specifically, a computing device implementing the LWI system 110 creates the execution log 114 within the same scope as an object 112 being modified. This enables a computing device implementing LWI system 110 to atomically perform both the intended update operation with the insertion of an entry into a storage system's execution log 114, using an AtomicBatchUpdate API provided by the LWI system 110, as discussed in further detail with respect to FIG. 2. For locked objects associated with an unfinished intent, when the execution log 114 includes entries for each step of an intent, a computing device implementing the LWI system 110 sends a conditional update to storage system 104 with the corresponding intent ID 120 and causes the storage system 104 to release a lock 118 on the object associated with the intent ID. Alternatively, in one or more implementations the final step in an intent is to unlock the locked object. Releasing a lock on an object can be performed by adjusting a lock attribute in the object's metadata, as discussed above. Because multiple different computing devices can concurrently execute same or different intents, this enables a computing device to ensure that an object is not updated or deleted by a different computing device while a declared intent is being performed with the object.

By associating a locked object 112 with an intent ID 120 and populating the storage system with information describing one or more steps associated with the intent in intent table 116, LWI system 110 causes the storage system to include the requisite information for completing an intent associated with a locked object. Additionally, by populating the storage system with information indicating which of the one or more steps are complete in execution log 114, LWI system 110 causes the storage system to store information describing execution progress associated with pending or incomplete intents. This enables a computing device to complete execution of an unfinished intent to unlock an object in the event that the original computing device that locked the object fails to complete the intent.

However, a computing device 102 interfacing with storage system 104 using LWI system 110 can fail while holding a lock. For example, application processes running on the computing device can crash, a network connecting the computing device to the storage system can drop or reorder messages, or the entire computing device can cease functioning. To account for these possible failures, LWI system 110 enables any computing device to access a locked object, even if the computing device is different than a computing device that originally locked the object, so long as the computing device requests access to the object using the indent ID 120 associated with the locked object. In this manner, different application instances can finish executing an unfinished intent in the event of failure, while ensuring exactly-once operations for each step in an intent. However, an object 112 may remain locked indefinitely if no computing devices request access to the locked object using the intent ID 120 associated with the locked object. This situation is resolved by implementing an intent collector module of the LWI system 110.

Figure 2:
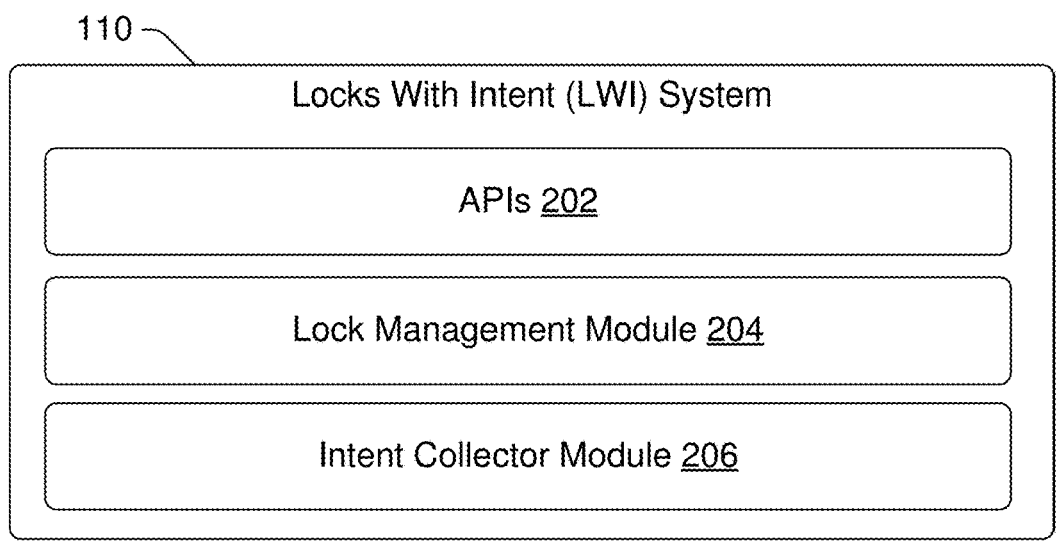
FIG. 2 illustrates an example locks with intent system in accordance with one or more embodiments.

FIG. 2 illustrates an example LWI system 110 in accordance with one or more embodiments. As discussed above, the LWI system 110 provides a computing device with an abstracted model for interfacing with a remote storage system, such as storage system 104 illustrated in FIG. 1. In this manner, a computing device interfacing with a remote storage system using LWI system 110 can access objects stored at the remote storage system without prior knowledge of the storage system's APIs or data storage capabilities. For example, as illustrated in FIG. 1, LWI system 110 enables computing device 102 to access objects 112 for one or more applications stored at storage system 104 without prior knowledge of storage system 104. In order to account for different data types, LWI system 110 models a storage system as including one or more schemaless tables that each include a plurality of partitions, which in turn each include a plurality of rows. LWI system 110 thus models a remote storage system as including one or more objects 112, an execution log 114, and an intent table 116, as illustrated in FIG. 1.

LWI system 110 includes APIs 202 for executing various operations on a remote storage system. In one or more embodiments, APIs 202 include operations to Create, Read, Update, and Delete (CRUD) objects in a storage system. The Create API creates an object with a specified value in a table of the storage system. The Read API returns a value of a specified object in a table of the storage system. The Update API updates the value of a specified object in the storage system. Similarly, the Delete API deletes a specified object from the storage system. When a computing device interfacing with a storage system uses any of the Create, Read, and Update APIs, a handle representative of the corresponding operation is returned to the computing device indicating completion of the operation specified by the API.

APIs 202 additionally enable operations to Scan, UpdateIfUnchanged, and AtomicBatchUpdate storage system objects, such as objects 112 as illustrated in FIG. 1. The Scan API takes a storage system table and a predicate as parameters and returns a stream including all objects in that table satisfying that predicate. For example, in one or more embodiments the Scan predicate is "has a count attribute with value greater than 5". The Scan API with this predicate would then return a stream including every object in the identified table having an attribute value greater than five. However, an object that only satisfies the predicate during a portion of the scan will not necessarily be included in the return stream. For example, if the object was created, updated, or deleted during the scan, the object may only satisfy the predicate during portions of the scan.

The UpdateIfUnchanged API considers whether an object has been updated or deleted since a specified previous operation on that object. If the object has been updated or deleted since a previous operation, which is identifiable by a handle passed to the UpdateIfUnchanged API, the UpdateIfChanged operation does nothing. A computing device interfacing with a remote storage system using the LWI system 110 can obtain handles regarding object changes because each of the Create, Read, and Update API's operations return a handle representing that operation.

The AtomicBatchUpdate API enables the LWI system 110 to perform multiple update and insert operations atomically. As discussed herein, atomic operations appear to occur concurrently and instantaneously to the host storage system. For example, atomic operations guarantee either that all operations occur or that no operations occur, despite potential system failures. In order to ensure atomicity, the AtomicBatchUpdate API's operations are limited to objects in the same scope. A scope, as discussed herein, refers to a system-specific parameter. For example, a scope may be a document, a table, a table partition, a table row, or any other logical data collection supported by a storage system.

The APIs 202 enable a computing device implementing LWI system 110 to interface with a variety of different distributed storage systems, even if the different distributed storage systems offer different APIs. LWI system 110 ensures compatibility of APIs 202 with a remote storage system through the use of a shim. The shim is a layer that implements calls of APIs 202 using APIs that are naturally supported by a storage system.

Using APIs 202, a computing device implementing LWI system 110 is able to interact with one or more storage system objects, such as objects 112 in storage system 104, as illustrated in FIG. 1, in order to execute functionality for an application stored at the storage system.

LWI system 110 additionally includes lock management module 204. Lock management module 204 implements locking and unlocking of application objects stored in a storage system, such as storage system 104 illustrated in FIG. 1. As discussed above and in further detail below with respect to FIGS. 3-5, lock management module 204 implements locking and unlocking of application objects by associating storage system objects with locks and intent identifiers to ensure exactly-once semantics for all intents associated with the storage system objects.

To ensure that locked objects do not remain locked indefinitely, LWI system 110 additional includes intent collector module 206. Intent collector module 206 is configured to ensure liveness in storage system 104 by completing unfinished intent steps associated with locked objects in the storage system.

A computing device implementing LWI system 110 employs the intent collector module 206 to periodically query a storage system for unfinished intents and to complete any unfinished intent steps. Specifically, a computing device uses intent collector module 206 to periodically poll the intent table of a storage system and compare the listed intent steps against entries in the execution log to ascertain incomplete intent steps. The intent collector module 206 is configured to poll the storage system at any suitable interval, such as once per second, once per minute, and so on. If the intent collector module 206 determines that a storage system object, such as one of objects 112 in FIG. 1, is locked for greater than a threshold amount of time, the intent collector module is configured to ascertain an intent ID associated with the locked object as well as the incomplete steps associated with the intent ID. In accordance with one or more embodiments, the intent collector module 206 ascertains that the object has been locked for a threshold amount of time by using the ascertained intent ID to identify a corresponding intent in the intent table on the storage system hosting the locked object. The intent collector module 206 identifies a start time associated with the intent in the intent table and compares the start time against a current time to determine an amount of time that the object has been locked. The threshold amount of time may be configurable by a user of the computing device and may be any amount of time. In accordance with one or more embodiments, the threshold amount of time is one second or less.

Accordingly, a computing device implementing the intent collector module 206 of LWI system 110 can interface with a storage system to release an object lock, even if the computing device was not responsible for setting the lock, to obtain access to a locked object while ensuring exactly-once semantics of any associated intents. The intent collector module 206 thus ensures liveness in a storage system by completing unfinished intents despite failure of a computing device connected to the storage system.

In one or more embodiments, the intent collector module 206 is also configured to perform garbage collection for a storage system's execution logs and intent tables, such as execution logs 114 and intent tables 116 of storage system 104, as illustrated in FIG. 1. Garbage collecting execution logs 114 and intent tables 116 refers to the deletion of entries in the execution logs 114 and deletion of intent steps from intent tables 116. To prevent premature garbage collection, intent collector module 206 performs garbage collection in epoch intervals. As discussed herein, an epoch refers to a configurable duration of time. In accordance with one or more embodiments, an epoch may be intent-specific and defined by a developer of an application associated with the intent. For example, intent A may be associated with 1 day epochs while intent B may be associated with 1 hour epochs. For performing garbage collecting, the intent collector module identifies an epoch n associated with an intent ID 120 using an intent's associated start time and does not perform garbage collection on entries in an execution log 114 or intent table 116 that are associated with the intent ID until the intent ID is outdated. In accordance with one or more embodiments, the intent collector module 206 identifies an intent ID 120 as outdated during epoch n+2 and beyond.

In addition to ensuring exactly-once semantics for executing application functionality of applications in a distributed storage system, the techniques discussed herein provide added storage system functionality that is not natively offered by the underling storage system.

For example, the techniques discussed herein enable reliable snapshotting of storage systems. By associating storage system objects with locks and intents, the techniques herein eliminate interleavings during snapshotting operations that might be left by a second computing device accessing the object during snapshotting by a first computing device. Similarly, the techniques discussed herein enable live re-partitioning of storage system tables that enables concurrent operations. Re-partitioning refers to the process of migrating a storage system object from one location in the storage system to another location. By implementing locks with intents on objects, the techniques discussed herein prevent different computing devices from updating or reading objects during re-partitioning. Live re-partitioning using the locks with intent techniques discussed herein enables a storage system to account for partitions that exceed a system-imposed partition size limit without negatively affecting system liveness. The techniques discussed herein additionally enable use of secondary indices. A secondary index for a storage system table T is a separate table T' configured to allow quick lookups into T. Because storage systems do not natively support multi-table atomic transactions, conventional use of secondary indices results in situations where the content of T and T' is inconsistent with each other. However, the techniques discussed herein enable concurrent updating, inserting, and deleting rows in T and T' by defining the various operations as steps of a single intent. Because the techniques discussed herein require "all or nothing" performance of intent steps, secondary index problems caused by intermediate failures are eliminated. Further, the techniques discussed herein enable transactions among different storage system tables and partitions by using intents as transaction coordinators.

Figure 3:
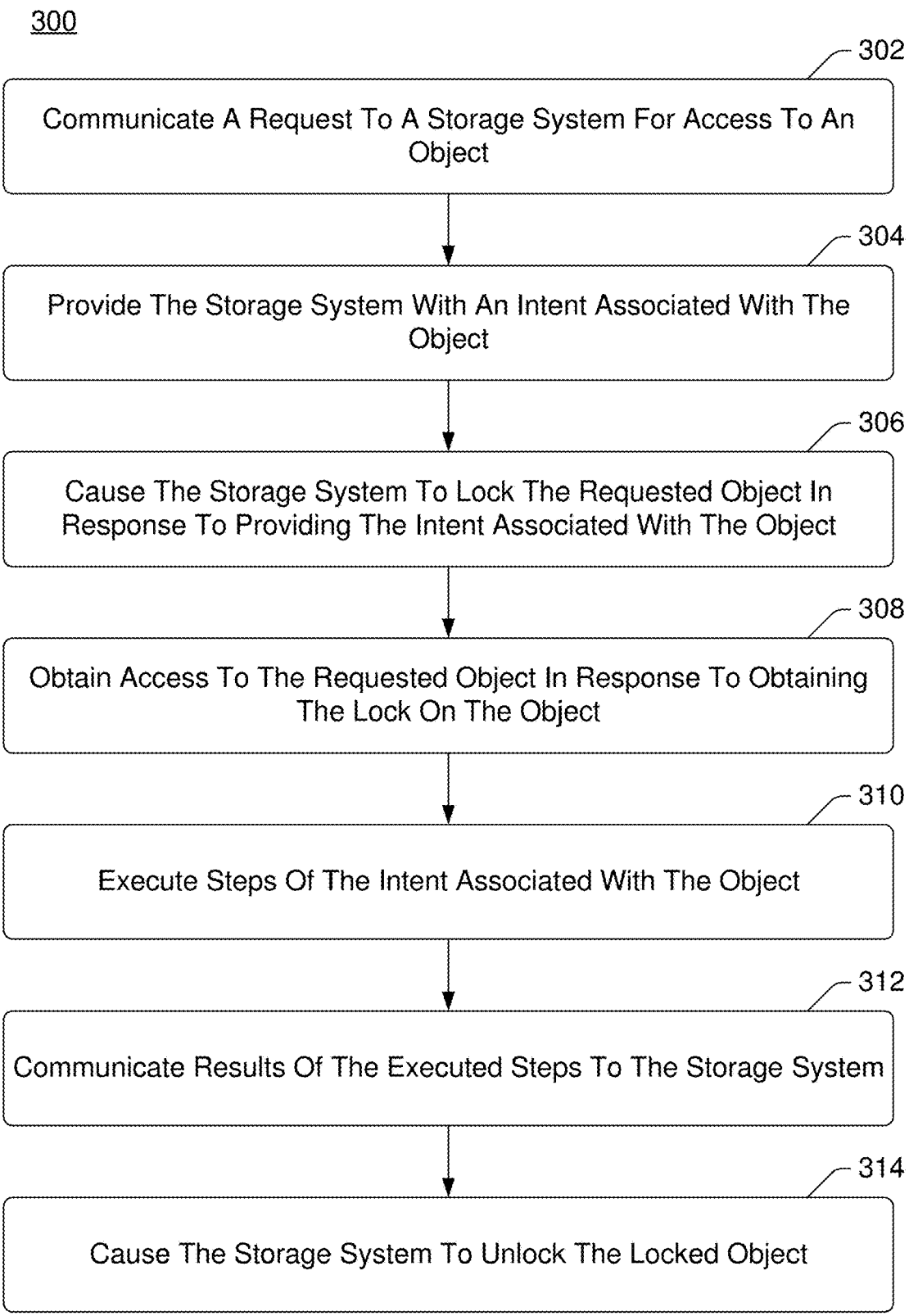
FIG. 3 is a flowchart illustrating an example process for obtaining a lock on a storage system object with an associated intent in accordance with one or more embodiments.

FIG. 3 is a flowchart illustrating an example process 300 for obtaining a lock on a storage system object with an associated intent in accordance with one or more embodiments. Process 300 is carried out by a computing device implementing a locks with intent system and interfacing with a storage system, such as a computing device 102 implementing LWI system 110 and interfacing with storage system 104, as illustrated in FIG. 1. Process 300 can be implemented in software, firmware, hardware, or combinations thereof. Process 300 is shown as a set of acts and is not limited to the order shown for performing the operations of the various acts. Process 300 is an example process for obtaining a lock on a storage system object with an associated intent in accordance with one or more embodiments; additional discussions of obtaining a lock on a storage system object with an associated intent are included herein with reference to different figures.

In process 300, a computing device communicates a request to a storage system for access to an object (act 302). The requested object can comprise a table in the storage system, a partition of a table in the storage system, or a row of a table in the storage system. The requested object includes application data for an application stored at the storage system and is useable by the computing device to execute application functionality for the application stored at the storage system.

The computing device additionally provides the storage system with an intent associated with the object (act 304). The communicated intent is an arbitrary snippet of code that accompanies the request and indicates one or more computing device operations to be performed with the requested object. Additionally or alternatively, the communicated intent indicates one or more storage system operations to be performed with the requested object. The communicated intent includes at least one step, which details computing device and/or storage system operations to be performed with the requested object, as discussed above. The steps associated with the intent are listed in an intent table stored on the storage system and are associated with an intent ID that identifies the intent. The intent ID is entered as metadata associated with the object in the storage system, as discussed above.

In response to providing the storage system with the intent associated with the object, the computing device causes the storage system to lock the requested object (act 306). Locking the requested object prohibits other computing devices from accessing the object while it is locked. In accordance with one or more embodiments, a computing device causes the storage system to lock the object by setting a Boolean value as metadata associated with the object in the storage system, which indicates that the object is locked. The computing device is configured to set a Boolean value as metadata associated with the object via an invisible entry in the storage system.

The computing device obtains access to the requested object in response to obtaining the lock on the object (act 308). Obtaining access to the requested object comprises obtaining application data for the application stored at the storage system that is useable by the computing device to execute application functionality for the application, as discussed above.

After the computing device obtains access to the requested object, the computing device executes one or more steps of the intent associated with the object (act 310). In accordance with one or more embodiments, executing the one or more steps of the intent includes performing one or more actions or operations associated with application functionality using an application computation module of the computing device.

After the computing device executes an intent step, the computing device communicates one or more results of the executed step to the storage system (act 312). Results of an executed intent step are communicated through distributed atomic affinity logging, which refers to the process of collocating the result of a step's execution in the storage system near the object that the step's execution changes. Specifically, the computing device communicates a log entry signifying the completion of an intent step to the storage system and causes the storage system to update an execution table with the communicated log entries. These communicated log entries are invisible to applications stored on the storage system, but are ascertainable by computing devices that execute application functionality on behalf of the applications. This enables multiple computing devices to ascertain an execution status of intent steps for an intent associated with a locked object.

After the computing device executes each step of the intent and communicates results of the executed steps to the storage system, the computing device causes the storage system to unlock the locked object (act 314). Unlocking the locked object permits the storage system to provide other computing devices with access to the unlocked object. In accordance with one or more embodiments, a computing device causes the storage system to unlock the locked object by adjusting a Boolean value previously set by the computing device to indicate whether the object is locked. As discussed above, this Boolean value is represented in metadata associated with the object in the storage system. The computing device is configured to adjust the Boolean value by communicating an invisible entry associated with the locked object to the storage system.

Figure 4:
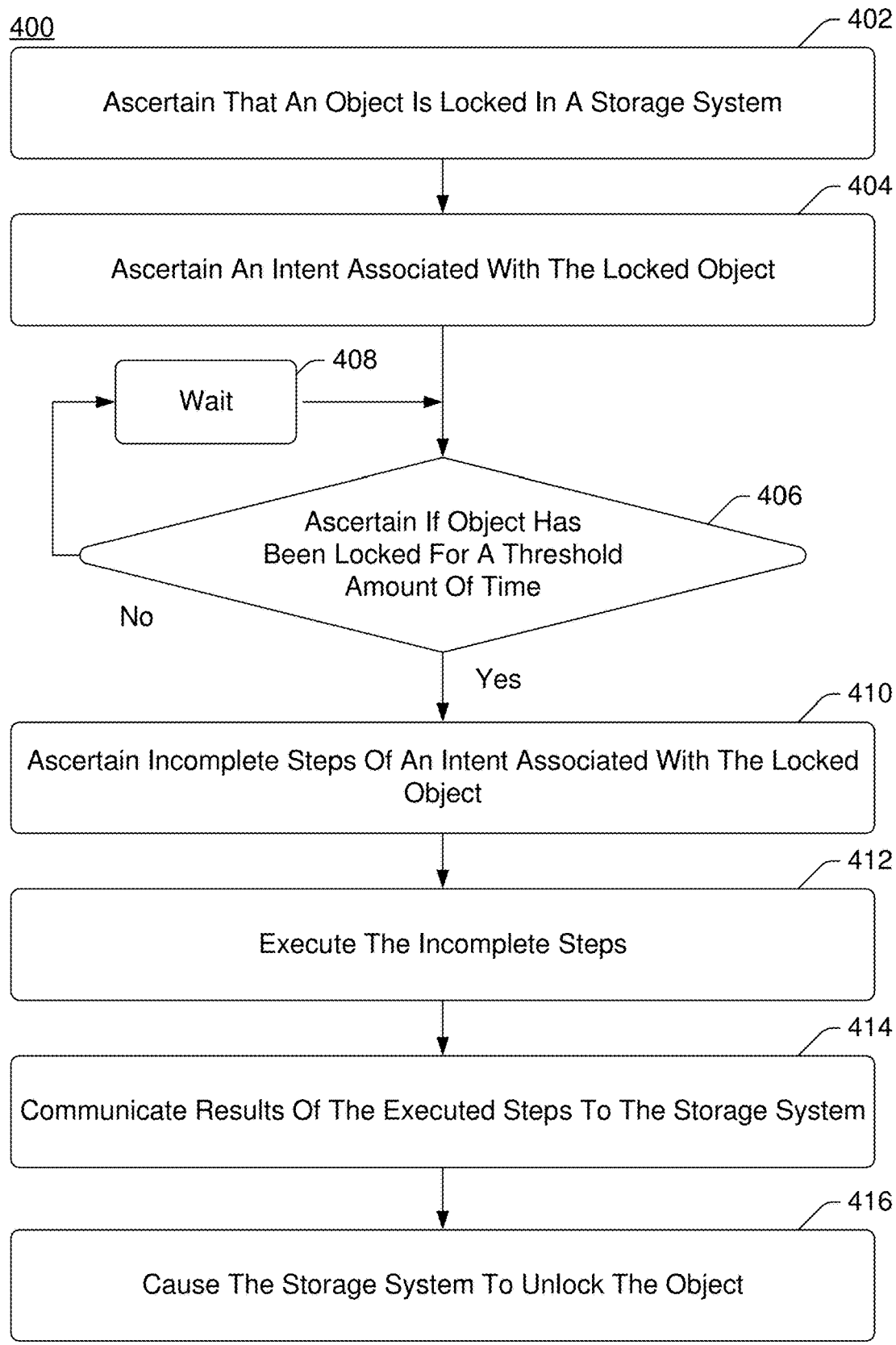
FIG. 4 is a flowchart illustrating an example process for unlocking a locked storage system object with an associated intent in accordance with one or more embodiments.

FIG. 4 is a flowchart illustrating an example process 400 for unlocking a locked storage system object with an associated intent in accordance with one or more embodiments. Process 400 is carried out by a computing device implementing a locks with intent system and interfacing with a storage system, such as a computing device 102 implementing LWI system 110 and interfacing with storage system 104, as illustrated in FIG. 1. Process 400 can be implemented in software, firmware, hardware, or combinations thereof. Process 400 is shown as a set of acts and is not limited to the order shown for performing the operations of the various acts. Process 400 is an example process for unlocking a locked storage system object with an associated intent in accordance with one or more embodiments; additional discussions of unlocking a locked storage system object with an associated intent are included herein with reference to different figures.

In process 400, a computing device ascertains that an object in a storage system is locked (act 402). In accordance with one or more embodiments, the computing device ascertains that the object is locked by inspecting metadata in the storage system that is associated with the object and identifying a Boolean value indicating a lock in the metadata. In accordance with one or more embodiments, the computing device ascertains that the object is locked in response to requesting access to the locked object.

In response to ascertaining that the object is locked, the computing device ascertains an intent associated with the locked object (act 404). In accordance with one or more embodiments, the computing device ascertains the intent associated with the locked object by inspecting metadata in the storage system that is associated with the object and identifying an intent ID that identifies an intent in the metadata. In accordance with one or more embodiments, the computing device ascertains an intent associated with a locked object in response to requesting access to the locked object.

The computing device then ascertains if the object has been locked for a threshold amount of time (act 406). In accordance with one or more embodiments, the computing device ascertains if the object has been locked for a threshold amount of time by using the ascertained intent ID to identify a corresponding intent listed in an intent table on the storage system. The computing device identifies a start time associated with the intent that corresponds to the intent ID and compares it against a current time to determine an amount of time that the object has been locked. In accordance with one or more embodiments, the threshold amount of time is specific to an intent associated with the object and is indicated as metadata in the intent table. The threshold amount of time may be specified by a user of the computing device or may be pre-specified by an application developer.

If the computing device ascertains that the object has not been locked for the threshold amount of time, the computing device waits until the threshold amount of time has elapsed (act 408). Waiting until the threshold amount of time has elapsed allows another computing device that may be executing one or more steps associated with an intent to finish executing these steps.

If the computing device ascertains that the object has been locked for the threshold amount of time or longer, the computing device ascertains incomplete steps of an intent associated with the locked object (act 410). The computing device ascertains incomplete steps of an intent by using the ascertained intent ID to identify a corresponding intent and one or more steps of the corresponding intent, which are listed in the intent table on the storage system. Upon identifying the one or more steps of the corresponding intent, the computing device ascertains which of the one or more intent steps lack corresponding entries in an execution log stored in the storage system. As discussed above, an entry in the execution log indicates that execution of an intent step is complete, thus the absence of an entry corresponding to an intent step represents an incomplete intent step.

In response to ascertaining the incomplete steps of the intent associated with the locked object, the computing device executes the incomplete steps (act 412). In accordance with one or more embodiments, execution of the incomplete steps is performed by an intent collector module of the computing device.

After executing the incomplete intent steps, the computing device communicates results of the executed steps to the storage system (act 414). Results of an executed intent step are communicated through distributed atomic affinity logging, which refers to the process of collocating the result of a step's execution in the storage system near the object that the step's execution changes. Specifically, the computing device communicates a log entry signifying the completion of an intent step to the storage system and causes the storage system to update the execution table with the communicated log entries. These communicated log entries are invisible to applications stored on the storage system, but are ascertainable by computing devices that execute application functionality on behalf of the applications. This enables multiple computing devices to ascertain an execution status of intent steps for an intent associated with a locked object.

After the computing device executes each incomplete step and communicates results of the executed steps to the storage system, the computing device causes the storage system to unlock the locked object (act 416). Unlocking the locked object permits the storage system to provide other computing devices with access to the unlocked object. In accordance with one or more embodiments, a computing device causes the storage system to unlock the locked object by adjusting a Boolean value previously set by the computing device to indicate whether the object is locked. As discussed above, this Boolean value is represented in metadata associated with the object in the storage system. The computing device is configured to adjust the Boolean value by communicating an invisible entry associated with the locked object to the storage system.

Figure 5:
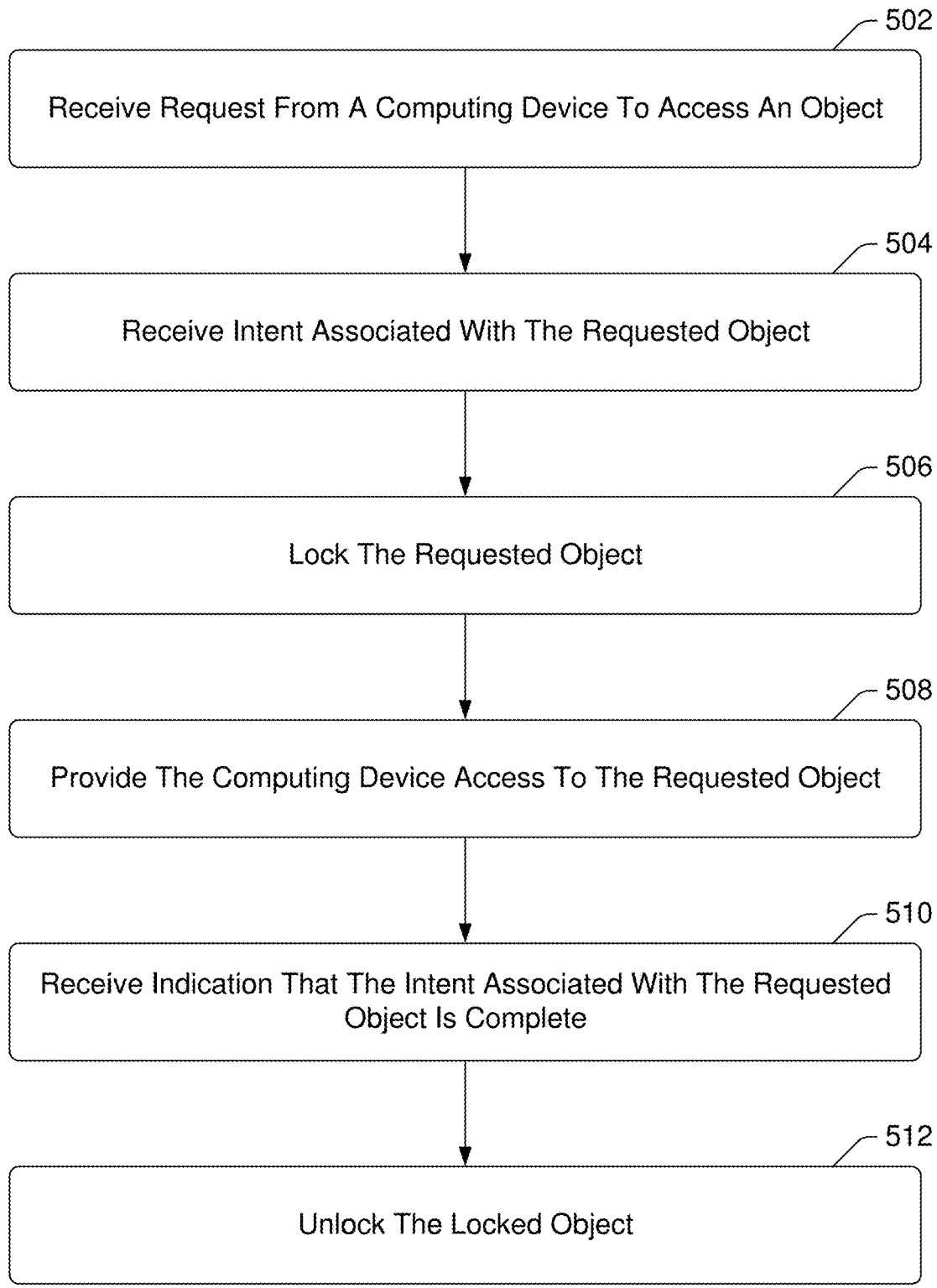
FIG. 5 is a flowchart illustrating an example process for locking a requested storage system object until an intent associated with the object is complete in accordance with one or more embodiments.

FIG. 5 is a flowchart illustrating an example process 500 for locking a requested storage system object until an intent associated with the object is complete in accordance with one or more embodiments. Process 500 is carried out by a computing device implementing a storage system, such as storage system 104 of FIG. 1, and can be implemented in software, firmware, hardware, or combinations thereof. Process 500 is shown as a set of acts and is not limited to the order shown for performing the operations of the various acts. Process 500 is an example process for locking a requested storage system object until an intent associated with the object is complete in accordance with one or more embodiments; additional discussions of locking a requested storage system object until an intent associated with the object are included herein with reference to different figures.

In process 500, a request to access an object is received from a computing device (act 502). The requested object can comprise a partition in a storage system, a table in the storage system, or a row of a table in the storage system. In accordance with one or more embodiments, the requested object includes application data for an application stored at the storage system and that is useable by the computing device to execute application functionality for the application stored at the storage system.

An intent associated with the requested object is received from the computing device (act 504). The received intent is an arbitrary snippet of code that may accompany the request and indicates one or more computing device operations to be performed with the requested object. Additionally or alternatively, the communicated intent indicates one or more storage system operations to be performed with the requested object. The communicated intent includes at least one step, which details computing device and/or storage system operations to be performed with the requested object, as discussed above. The at least one step associated with the intent is entered in an intent table stored on the storage system and is associated with the intent as well as an intent ID that identifies the intent. The intent ID is entered as metadata associated with the object in the storage system, as discussed above.

In response to receiving the intent associated with the requested object, the computing device implementing the storage system locks the requested object (act 506). Locking the requested object prohibits computing devices from accessing the object while it is locked unless the computing devices execute intent steps associated with the lock. In accordance with one or more embodiments, a computing device causes the storage system to lock the object by setting a Boolean value as metadata associated with the object in the storage system, which indicates that the object is locked.

In response to locking the requested object, the computing device implementing the storage system provides the requested object to the computing device that requested the object (act 508). In accordance with one or more embodiments, providing access to the requested object comprises providing application data for an application stored by the storage system. This application data is useable by the requesting computing device to execute application functionality for the application, as discussed above.

The computing device implementing the storage system then receives an indication that the intent associated with the requested object is complete (act 510). In accordance with one or more embodiments, receiving an indication that the associated intent is complete comprises receiving results associated with executing one or more intent steps through distributed atomic affinity logging. Upon receiving results associated with executing one or more intent steps, the computing device implementing the storage system collocates the results in the storage system using an execution table. This execution table is populated with log entries, which signify the completion of an intent step, as discussed above. These communicated log entries are invisible to applications stored on the storage system, but are ascertainable by computing devices that execute application functionality on behalf of the applications. This enables multiple computing devices to ascertain an execution status of intent steps for an intent associated with a locked object.

Upon receiving an indication that all steps of the intent associated with the requested object are complete, the computing device implementing the storage system unlocks the requested object (act 512). Unlocking the locked object permits the storage system to provide other computing devices with access to the unlocked object. In accordance with one or more embodiments, the storage system unlocks the requested object by adjusting a Boolean value associated with the requested object. As discussed above, this Boolean value is represented in metadata associated with the object in the storage system.

Although the techniques discussed herein have been made with reference to a distributed computing environment where a computing device is implemented remotely from a storage system, additionally or alternatively the techniques discussed herein can be implemented on a single computing device. For example, returning to FIG. 1, a single one of computing devices 102 can include multiple instances of the application computation module 108, each associated with its own LWI system 110. In a single computing device environment, the multiple instances of the application computation module 108 can be connected to one another via a system bus or other data and command transfer system, which provides similar functionality to that of network 104. In a single computing device 102 implementation, the multiple instances of the application computation module 108 access objects from memory/storage capacity provided by one or more computer-readable media of the computing device 102. In this implementation, the memory/storage of the computing device represents functionality of the storage system 104, as described herein. Thus, the techniques herein can be used both in distributed computing environments as well as a single computing device environment.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
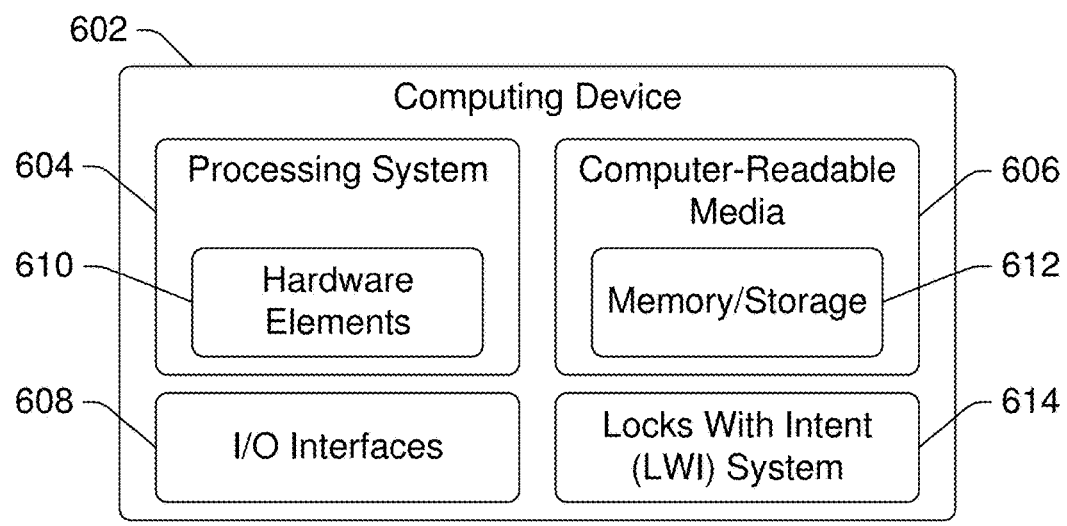
FIG. 6 illustrates an example system that includes an example computing device that is representative of one or more systems and/or devices that may implement the various techniques described herein.
Figure 6:
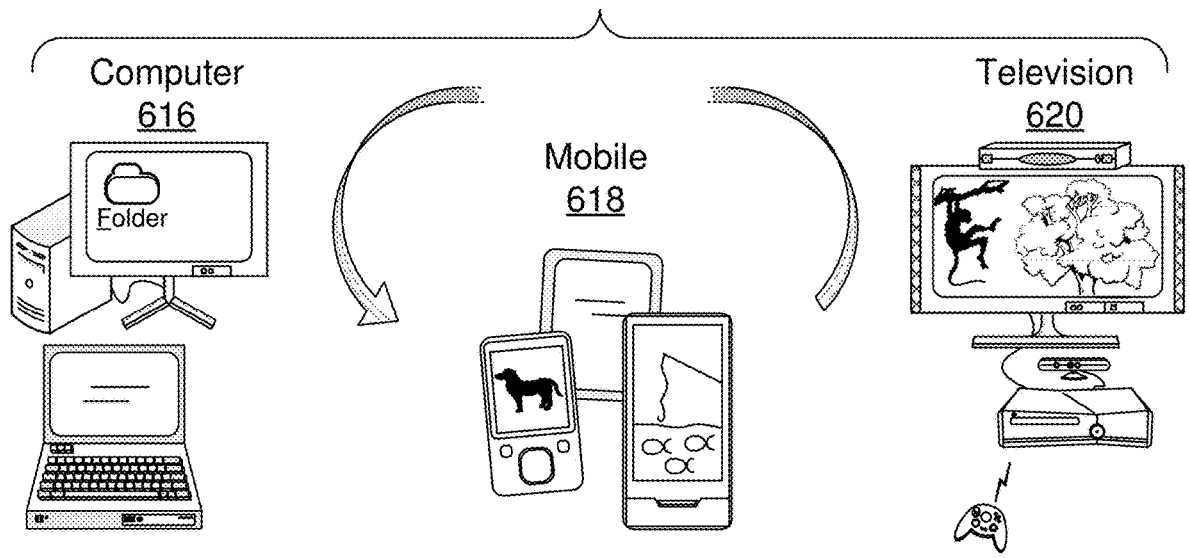

FIG. 6 illustrates an example system generally at 600 that includes an example computing device 602 that is representative of one or more systems and/or devices that may implement the various techniques described herein. The computing device 602 may be, for example, a server of a service provider, one of a plurality of virtual machines implemented on a full resource computing device, a device associated with a client (e.g., client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a locks with intent (LWI) system 614. The LWI system 614 provides various functionality to lock objects with an associated intent and unlock objects by completing steps of an associated intent as discussed above. The LWI system 614 can implement, for example, the LWI system 110 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, server, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: communicating, to a storage system, a request for access to an object; providing, to the storage system, an intent associated with the object; obtaining access to the object in response to providing the intent associated with the object; executing one or more steps of the intent associated with the object; and communicating, to the storage system, results of the one or more steps of the intent associated with the object, enabling the storage system to record that the one or more steps have been performed and ensuring execution of each step of the intent exactly once.

Alternatively or in addition to any of the above described methods, any one or combination of: wherein the one or more steps of the intent associated with the object describe one or more computing device operations or storage system operations to be performed with at least the object; wherein the object comprises a location in memory of the storage system, the location comprising at least a portion of one of a table in the storage system, a partition of a table in the storage system, or a row of a table in the storage system; wherein providing the intent associated with the object comprises providing an intent identifier of the intent associated with the object to the storage system, causing the storage system to update metadata associated with the object to include an intent identifier of the intent associated with the object, and causing the storage system to include, in an intent table, a serialized listing of the one or more steps of the intent associated with the object; wherein communicating the results of the one or more steps of the intent associated with the object comprises causing the storage system to generate an execution log that includes one or more entries, wherein individual ones of the one or more entries indicate that the computing device has completed executing a corresponding individual one of the one or more steps of the intent associated with the object; the method further comprising causing the storage system to lock the object as part of an execution of a first step of the intent; wherein causing the storage system to lock the object prevents a computing device that is not requesting access to the object in order to perform the one or more steps of the intent associated with the object from accessing the object until execution of the intent associated with the object is complete; wherein causing the storage system to lock the object allows one or more different computing devices that are requesting access to the object in order to perform the one or more steps of the intent associated with the object to access the object.

A method implemented in a computing device, the method comprising: ascertaining that an object stored in a storage system is locked; ascertaining an intent that is associated with the locked object; ascertaining one or more incomplete steps of the intent associated with the locked object; executing the one or more incomplete steps of the intent; communicating results of the executed one or more steps of the intent to the storage system; and causing the storage system to unlock the object in response to communicating the results of the executed one or more steps of the intent to the storage system.

Alternatively or in addition to any of the above described methods, any one or combination of: wherein ascertaining that the object stored in the storage system is locked is performed in response to requesting access to the object; wherein ascertaining the intent associated with the locked object comprises ascertaining an intent identifier of the intent, the intent identifier being included in metadata for the object stored in the storage system; wherein ascertaining the one or more incomplete steps of the intent associated with the object comprises ascertaining an intent identifier of the intent, ascertaining a list of one or more steps associated with the intent using the intent identifier, the list of one or more steps including the one or more incomplete steps, polling an execution log of the storage system to ascertain if any of the list of one or more steps are complete, and ascertaining the one or more incomplete steps of the intent based on an absence of one or more log entries in the execution log; wherein the one or more incomplete steps of the intent associated with the object describe one or more computing device operations or storage system operations to be performed with the object; wherein the computing device is different from a computing device that caused the storage system to lock the object; wherein the storage system is implemented remotely from the computing device in a distributed computing environment; the method further comprising ascertaining whether the locked object has been locked for a threshold amount of time and waiting, by the computing device, for the threshold amount of time to elapse in response to determining that the locked object has not been locked for the threshold amount of time; wherein the threshold amount of time is dependent on the intent associated with the object; wherein ascertaining whether the locked object has been locked for the threshold amount of time comprises ascertaining a start time associated with the intent, comparing the start time with a current time to determine an elapsed time of the intent, and comparing the elapsed time against the threshold amount of time, wherein the object is locked for the threshold amount of time if the elapsed time is of a duration that is longer than the threshold amount of time.

A storage system comprising: a processor; and a computer-readable storage medium having stored thereon multiple instructions that implement a platform of the computing device and that, responsive to execution by the processor, cause the processor to: receive a request from a computing device for access to an object; receive, from the computing device, an intent associated with the object; provide the computing device with access to the object in response to receiving the intent associated with the object; receive an indication that execution of one or more steps of the intent associated with the object is complete; and enter one or more entries into an execution log, individual ones of the one or more entries indicating completion of one of the one or more steps of the intent and ensuring execution of each of the one or more steps of the intent exactly once.

Alternatively or in addition to any of the above described systems, any one or combination of: the multiple instructions further causing the processor to lock the object and prevent a computing device that is not requesting the object in order to perform the one or more steps of the intent associated with the object in response to receiving the intent associated with the object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, from a first computing device, a request for access to a data object, wherein the data object is locked for execution of an intent associated with the data object that is to be completed by a second computing device;
   accessing an execution log that comprises entries for one or more steps of the intent;
   determining, from analysis of the entries of the execution log, that a step of the one or more steps of the intent is uncompleted by the second computing device;
   releasing a lock on the data object based on the determining that the step is uncompleted by the second computing device; and
   re-assigning execution of the step to the first computing device, wherein the re-assigning comprises locking the data object for completion of the intent by the first computing device.

2. The computer-implemented method of claim 1, further comprising: updating the execution log to add an entry for the re-assigning of execution of the step to the first computing device.

3. The computer-implemented method of claim 1, further comprising: unlocking the data object based on completion of the step by the first computing device.

4. The computer-implemented method of claim 1, wherein the determining that the step of the one or more steps of the intent is uncompleted comprises determining that a predetermined amount of time has passed since locking the data object for execution of the intent by the second computing device, and wherein the releasing releases the lock on the data object based on determining that the step is uncompleted by the second computing device after the predetermined amount of time has passed.

5. The computer-implemented method of claim 1, wherein the computer-implemented method is executed by an intent management component associated with a storage system, and wherein the intent management component manages access to a plurality of data objects by a plurality of computing devices.

6. The computer-implemented method of claim 5, wherein the intent management component executes distributed atomic affinity logging to manage the execution log.

7. The computer-implemented method of claim 5, wherein the intent management component ensures execution of the one or more steps exactly once to avoid duplicate processing.

8. A system comprising:
at least one processor; and
a memory, operatively connected with the at least one processor, storing computer-executable instructions that, when executed by the at least one processor, cause the at least one processor to execute a method that comprises:
  receiving, from a first computing device, a request for access to a data object, wherein the data object is locked for execution of an intent associated with the data object that is to be completed by a second computing device,
  accessing an execution log that comprises entries for one or more steps of the intent for the data object,
  determining, from analysis of the entries of the execution log, that a step of the one or more steps of the intent is uncompleted by the second computing device,
  releasing a lock on the data object based on the determining that the step is uncompleted by the second computing device, and
  re-assigning execution of the step to the first computing device, wherein the re-assigning comprises locking the data object for completion of the intent by the first computing device.

9. The system of claim 8, wherein the method, executed by the at least one processor, further comprises: updating the execution log to add an entry for the re-assigning of execution of the step to the first computing device.

10. The system of claim 8, wherein the method, executed by the at least one processor, further comprises: unlocking the data object based on completion of the step by the first computing device.

11. The system of claim 8, wherein the determining that the step of the one or more steps of the intent is uncompleted comprises determining that a predetermined amount of time has passed since locking the data object for execution of the intent by the second computing device, and wherein the releasing releases the lock on the data object based on determining that the step is uncompleted by the second computing device after the predetermined amount of time has passed.

12. The system of claim 8, wherein the method is executed by an intent management component associated with a storage system, and wherein the intent management component manages access to a plurality of data objects by a plurality of computing devices.

13. The system of claim 12, wherein the intent management component executes distributed atomic affinity logging to manage the execution log.

14. The system of claim 12, wherein the intent management component ensures execution of the one or more steps exactly once to avoid duplicate processing.

15. A computer-implemented method comprising:
  receiving, from a first computing device, a request for access to a data object, wherein the data object is locked for execution of an intent associated with the data object that is to be completed by a second computing device;
  determining that a predetermined time threshold has elapsed and a step of one or more steps of the intent is uncompleted by the second computing device;
  releasing a lock on the data object based on the determining that the predetermined time threshold has elapsed and the step is uncompleted by the second computing device; and
  re-assigning execution of the step to the first computing device, wherein the re-assigning comprises locking the data object for completion of the intent by the first computing device.

16. The computer-implemented method of claim 15, wherein an execution log is maintained that comprises one or more entries for the one or more steps of the intent, and wherein the one or more entries of the execution log are reviewed to determine that the predetermined time threshold has elapsed and the step of one or more steps of the intent is uncompleted by the second computing device.

17. The computer-implemented method of claim 16, further comprising: updating the execution log to add an entry for the re-assigning of execution of the step to the first computing device.

18. The computer-implemented method of claim 15, further comprising: unlocking the data object based on completion of the step by the first computing device.

19. The computer-implemented method of claim 15, wherein the computer-implemented method is executed by an intent management component associated with a storage system, and wherein the intent management component manages access to a plurality of data objects by a plurality of computing devices.

20. The computer-implemented method of claim 19, wherein the intent management component ensures execution of the one or more steps exactly once to avoid duplicate processing.

* * * * *